United States Patent
Lahey et al.

(10) Patent No.: US 7,624,284 B2
(45) Date of Patent: Nov. 24, 2009

(54) SECURE PRINT CONTROL AND RIGHTS MANAGEMENT SYSTEM

(75) Inventors: Leonard Corning Lahey, Boulder, CO (US); Adam A. Swartz, Thornton, CO (US); John Stuart Walker, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 625 days.

(21) Appl. No.: 10/430,619

(22) Filed: May 6, 2003

(65) Prior Publication Data

US 2004/0225886 A1 Nov. 11, 2004

(51) Int. Cl.
*G06F 11/30* (2006.01)
*G06F 7/04* (2006.01)

(52) U.S. Cl. .......................... 713/193; 726/31
(58) Field of Classification Search .............. 713/193; 380/51; 726/32, 31, 33
See application file for complete search history.

(56) References Cited

U.S. PATENT DOCUMENTS

| | | | |
|---|---|---|---|
| 4,757,543 A | 7/1988 | Tamada et al. | |
| 4,775,246 A | 10/1988 | Edelmann et al. | |
| 5,715,403 A | 2/1998 | Sstefik | |
| 5,875,247 A | 2/1999 | Nakashima et al. | |
| 6,202,092 B1* | 3/2001 | Takimoto | 709/225 |
| 6,351,813 B1* | 2/2002 | Mooney et al. | 713/185 |
| 6,708,157 B2* | 3/2004 | Stefik et al. | 705/59 |
| 6,862,583 B1* | 3/2005 | Mazzagatte et al. | 705/64 |
| 2001/0029581 A1* | 10/2001 | Knauft | 713/193 |
| 2003/0182475 A1* | 9/2003 | Gimenez | 710/8 |
| 2004/0205333 A1* | 10/2004 | Bjorkengren | 713/153 |
| 2005/0119967 A1* | 6/2005 | Ishiguro et al. | 705/38 |

* cited by examiner

*Primary Examiner*—Emmanuel L Moise
*Assistant Examiner*—Ali S Abyaneh
(74) *Attorney, Agent, or Firm*—Duft Bornsen & Fishman LLP

(57) ABSTRACT

A system and method for enforcing a usage control for a document, including: receiving an encrypted message, the encrypted message including a first key and a usage information authorization for the document, the encrypted message responsive to a second key to extract the first key and the usage information authorization; accepting an encrypted device datastream and securely decrypting the encrypted device datastream using the first key by a device, the device manager: generating a decrypted device datastream derived from the encrypted device datastream, transmitting the decrypted device datastream to the device without writing the decrypted device datastream to a user-accessible memory; and using the second key to access a datastore and to update a usage record for the document with the usage information authorization and a device status signal, the serializer providing the device manager with the print authorization signal when a device request is consistent with the usage record.

14 Claims, 2 Drawing Sheets

SECURE PRINT CONTROL AND RIGHTS MANAGEMENT SYSTEM

FIELD OF THE INVENTION

The present invention relates generally to document rights management and more specifically to secure printing of one or more documents.

BACKGROUND OF THE INVENTION

Monitoring and control over a third party's use of a proprietary document is a current goal of document owners. There are many systems for limiting use of and access of a third party to a proprietary document, but enforcement of any limitation of the third party's ability to print the document once the third party has a plaintext version of the document has not been as successful as desired. Current technologic solutions are ineffective once the third party has the plaintext version, so protections have relied on non-technologic solutions.

It is known to provide the proprietary document in a protected form, either encrypted or otherwise inaccessible, to the third party. Certain conditions are established before providing the third party with an ability to access an unprotected version of the proprietary document. Eventually, the third party is provided access and in the course of printing the document, a plaintext version of the proprietary document becomes available. A third party is able to circumvent technological controls regarding the document once they have access to the plaintext version.

Unfortunately, many solutions increase a management overhead associated with monitoring and enforcement of print rights, and that overhead increases with increasingly stricter compliance procedures. As the overhead increases, demand and use of the proprietary document decline.

Further, it is sometimes the case that it is more convenient or expedient to permit distributed printing of books. It is important to control the printing of books in such cases to ensure that authorized numbers of books are printed and accounted for.

Accordingly, what is needed is a system and method for document processing rights management that combines ease of use with an ability to enforce desired usage rights. The present invention addresses such a need.

SUMMARY OF THE INVENTION

A system and method is disclosed for a control system for enforcing a usage control for a document processed by a device. The control system includes a communications monitor for receiving an encrypted usage control message, the encrypted usage control message including a first security key and a usage information authorization for the document, the encrypted usage control message responsive to a second security key securely accessible by the communications monitor to extract the first security key and the usage information authorization; a device manager, responsive to a device authorization signal, for accepting an encrypted device datastream and securely decrypting the encrypted device datastream using the first security key, the device manager: generating a decrypted device datastream derived from the encrypted device datastream, transmitting the decrypted device datastream to the device without writing the decrypted device datastream to a user-accessible memory, and generating a device status signal; and a serializer, coupled to the communications monitor and the device manager, for using the second security key to access a secure datastore and to update a usage record for the document with the usage information authorization and the device status signal, the serializer providing the device manager with the print authorization signal when a device request is consistent with the usage record. The method of enforcing a usage control for a document processed by a device includes a) receiving an encrypted usage control message, the encrypted usage control message including a first security key and a usage information authorization for the document, the encrypted usage control message responsive to a second security key to extract the first security key and the usage information authorization; b) accepting an encrypted device datastream and securely decrypting the encrypted device datastream using the first security key by a device, the device manager: generating a decrypted device datastream derived from the encrypted device datastream, transmitting the decrypted device datastream to the device without writing the decrypted device datastream to a user-accessible memory, and generating a device status signal; and c) using the second security key to access a secure datastore and to update a usage record for the document with the usage information authorization and the device status signal, the serializer providing the device manager with the print authorization signal when a device request is consistent with the usage record.

By allowing a user to archive an encrypted version of a proprietary document and using an efficient secure communications channel (e.g., secure e-mail) to send an encrypted usage authorization message to a control system, the preferred embodiment of the control system securely authorizes specified document processing consistent with the sum of the usage authorization messages received to date. Authorizing additional processing is as simple as providing the third party with another electronic message. The present invention combines ease of use with an ability to enforce desired usage rights.

DETAILED DESCRIPTION

The present invention relates to secure printing of one or more documents. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein. To simplify the following discussion, the context for the preferred embodiment is a book order and fulfillment system for controlling the printing of proprietary books. The present invention is applicable to other types of proprietary documents and other types of processing functions beyond printing.

Figure 1:
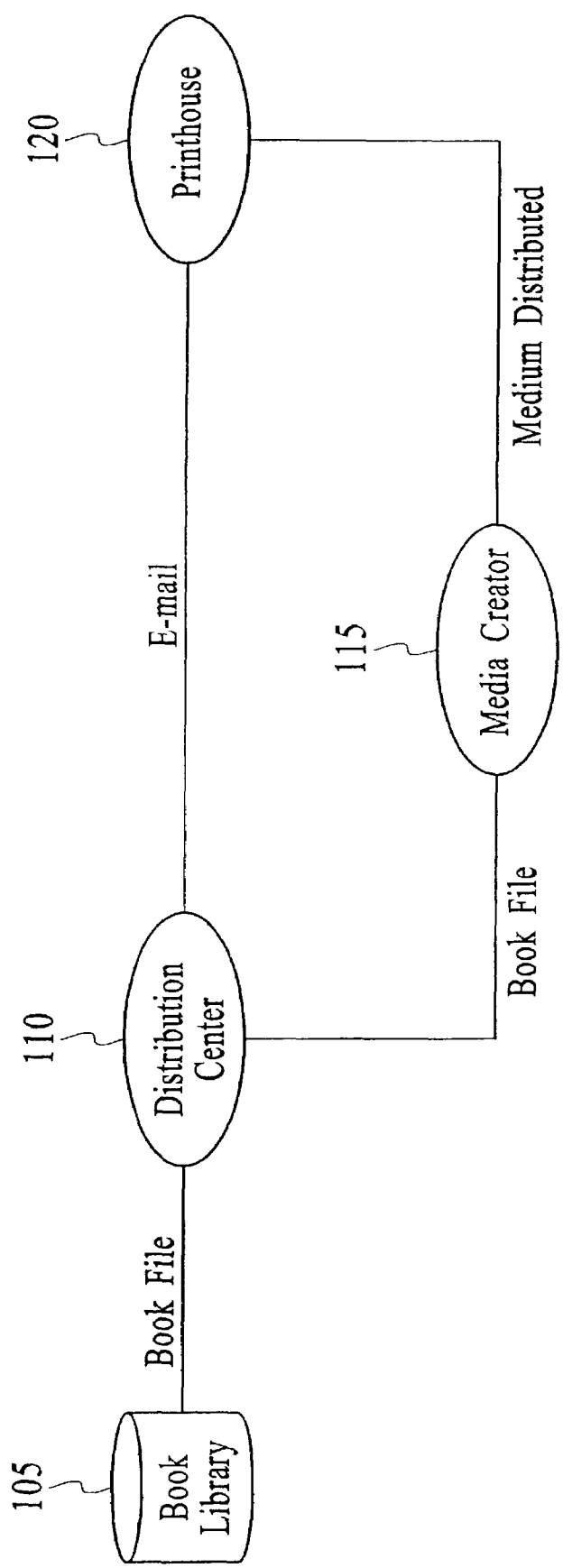
FIG. 1 is a schematic block diagram for a preferred embodiment of a book order system.

FIG. 1 is a schematic block diagram for a preferred embodiment of a book order system 100. System 100 includes a book library 105, a distribution server 110, a media creator 115 and a printhouse 120. Book library 105 is a database that stores book metadata (e.g. title, publisher, author(s), finishing options and other information about the book) and the content of the book (e.g. in a format like portable document format (PDF)). Book order system 100 preferably takes these formats and converts them (if necessary) into a preferred format like advanced function presentation (AFP) format.

Server 110 provides an interface to allow a particular book file to be located for processing. Server 110 retrieves necessary information regarding the particular book from book library 105 and sends it to media creator 115 after transforming it to an appropriate datastream (e.g. AFP) and encrypting to create an encrypted AFP document record.

Media creator 115 is a device for creating a nonvolatile document record that is provided to printhouse 120. Often these document records are very large requiring a specialized storage format. The preferred embodiment uses a CDROM burner as media creator 115 to generate a compact disk (CD) for storing a nonvolatile copy of the document record, though other implementations may use other formats, media, or systems. The document record on the CD is stored in a secure format that cannot be directly used by printhouse 120.

In a preferred embodiment, the document record is encrypted in any of several well-known encryption procedures such that a document access key permits decryption of the document record. Other document security systems may be used in addition to, or in lieu of, the encryption/decryption system. Server 110 issues the CD with the encrypted document record to printhouse 120. Server 110 additionally issues an authorization message to printhouse 120. The authorization message includes the decryption key as well as specific processing usage authorization controls (e.g., number of authorized copies) for the document record included on the CD. Printhouse 120 is provided with a control system for monitoring and controlling book production using one or more of the authorization messages. The authorization message of the preferred embodiment is also encrypted using a second key and sent to printhouse 120 using a secure communications channel. In the preferred embodiment, this authorization message is included in an e-mail transmission to printhouse 120.

Printhouse 120 receives the authorization message, extracts the decryption key and the processing usage authorization and processes the document record consistent with the usage authorization. When printhouse 120 desires to obtain additional processing authorization, for example print additional copies of document record, server 110 issues (e.g., e-mails) a new authorization message for the desired additional processing. No additional CD or document record is required to be sent. As described further below, the control system at printhouse 120 prevents an unprotected (e.g., plain-text) version of the document record to be accessible to the user.

Figure 2:
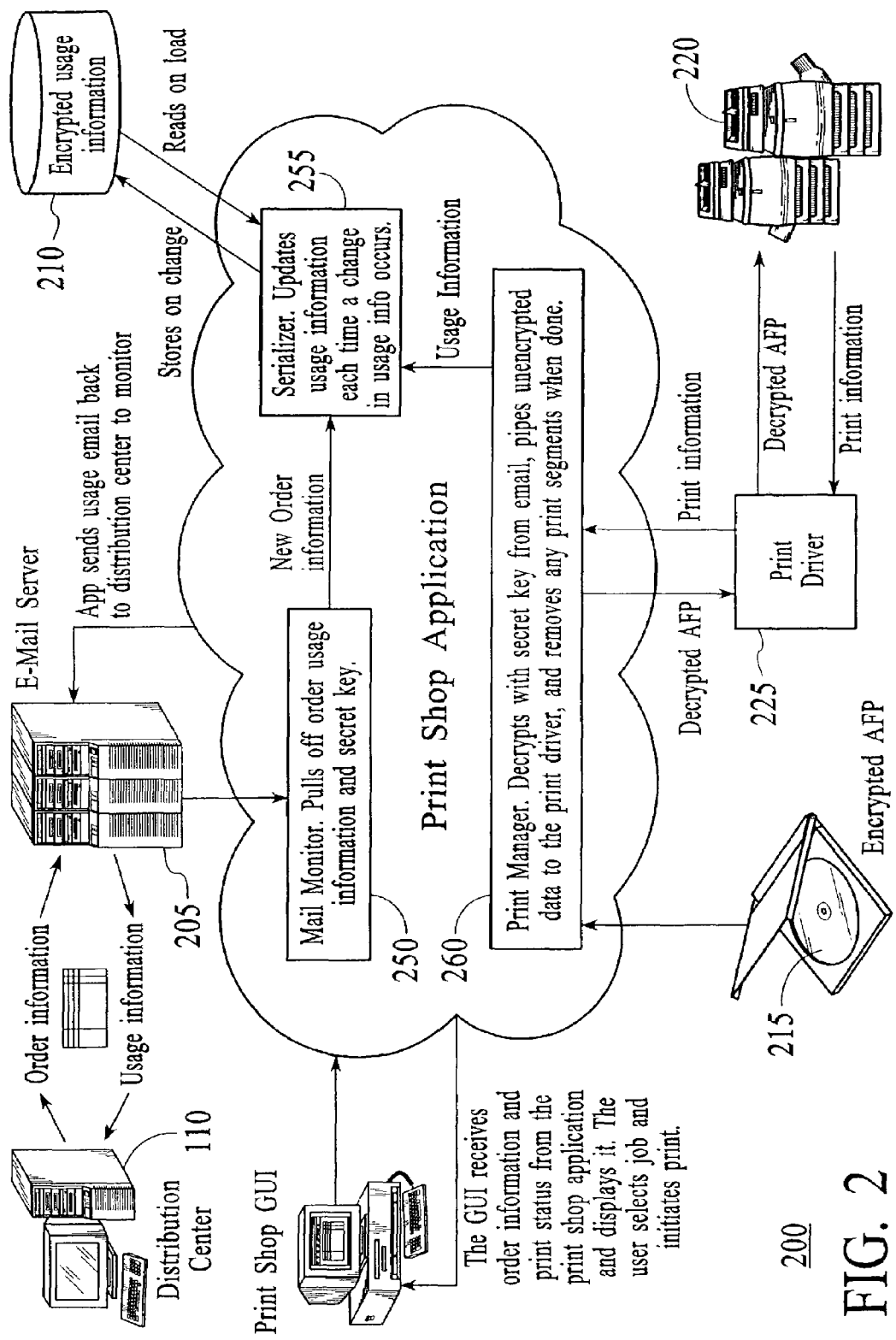
FIG. 2 is a schematic block diagram of a control system for usage rights management.

FIG. 2 is a schematic block diagram of a control system 200 for usage rights management included in printhouse 120 shown in FIG. 1. Control system 200 interfaces an e-mail server 205, a protected datastore 210 and an encrypted document record 215 to a document processor 220 (e.g., a printer) through a document process object (e.g., print driver) 225. Control system 200 includes a mail monitor 250, a serializer 255, and a print manager 260.

E-mail server 205 receives and stores the protected authorization message from server 110. If e-mail server 205 is accessible, then the authorization messages are tagged or coded so that control system 200 will not authorize processing based upon a copy of a previously processed authorization message.

Control system 200 stores the second key for the authorization message internally making it unavailable to a user. Mail monitor 250 uses the second key to derive the document record decryption key and usage processing authorization control from the authorization message. The usage processing authorization controls for the preferred embodiment includes a total print quantity authorized for printer 220. Mail monitor 250 provides the usage processing authorization control to serializer 255 and makes the decryption key available to print manager 260.

Datastore 210 is a user-inaccessible database that identifies the current state of the processing status for each document record being processed. In the preferred embodiment, this status includes a total quantity of books that can be printed, a total number of books that have been printed and a total number of books that have been submitted for printing. Serializer 255 provides an interface to update the processing status on datastore 205 each time a change occurs.

The document record 215 is available to print manager 260 that receives an encrypted datastream and uses the decryption key to perform a real-time decryption to obtain an unprotected (and printable) copy of the datastream. Print manager 260 pipes the unencrypted datastream to print driver 225 and removes segments of the unencrypted datastream when done. Print manager 260 provides serializer with printer status information as to the number of copies submitted for processing as well as the number of copies successfully made.

Printer 220 is a conventional printer system for production of books. The preferred embodiment is described interfacing to such a conventional printer. These printing systems typically employ Unix-based operating systems for converting a datastream into a bound book. Print driver 225 of the preferred embodiment is a PSF/6000 printer backend daemon process called PSF/6000 that transforms an incoming print job into an output datastream appropriate for printer 220. Print manager 260 interfaces with print driver 225 to pipe the user-inaccessible unencrypted datastream to printer 220 and to receive status information. The present invention may be adapted to other printer system 220 and/or other processing objects 225.

In operation, control system 200 reacts to a requested change in document record usage information, either due to a new usage authorization message sent from server 110 or to a requested print job. Control system 200 continually monitors for a requested change to the usage information, either a new authorization message detected by mail monitor 250 or a process request detected by print manager 260.

If a change is detected, control system 200 determines whether the usage change is due to a new authorization message. For a new authorization message, control system 200 updates datastore 210. Mail monitor 250 extracts the usage processing authorization control and the decryption key off of e-mail server 205. The authorization control is sent to serializer 255 to update the usage information in datastore 210. The decryption key is available for print manager 260 when necessary.

Control system 200 continues to monitor for requested changes in usage. Each new e-mail is processed as described above. When control system 200 detects a requested change from print manager 260, control system 200 analyzes the print request to determine how many copies have been requested for printing.

Control system 200 determines whether it should authorize the print request. The test used in the preferred embodiment is whether the request is consistent with the usage information in datastore 210. This is based upon the number of authorized copies as compared to the total number of copies printed and submitted as of the time the print request is made. If the new print quantity is greater than the available copies to be printed, control system 200 does not authorize the print job.

When the requested print quantity is less than or equal to the number of available copies, control system 200 authorizes printing. Control system 200 receives the encrypted print datastream (encrypted AFP) at print manager 260 and print manager 260 uses the decryption key to generate an unencrypted datastream. Control system 200 pipes the unencrypted datastream to print driver 225 for printing.

In the preferred embodiment, control system 200 includes a user interface to present a job list of all document records and associated usage record information. A user is able to print any of the document records up to the authorized limit, and the user can request and receive additional e-mail authorization messages when a desired print quantity exceeds the current authorization amount. Additionally, control system 200 uses mail server 205 to return periodic reports of usage information to server 110 for audit and accounting information.

Control process 200 updates datastore 210 with the number of copies submitted for printing, and when printed, the number actually printed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for printing a document, the system comprising:
   a print manager configured to receive an encrypted document for printing;
   a mail monitor configured to receive an email authorization message including a decryption key for the encrypted document and document usage information for the encrypted document and tag the email authorization message to prevent a subsequent copy of the authorization message from being processed;
   the print manager responsive to receiving a first request for printing the encrypted document further configured to:
     process the email to retrieve the document usage information;
     determine from the document usage information if the first request for printing the encrypted document is authorized;
     if the first request for printing the encrypted document is authorized, then the print manager further configured to:
       process the email to retrieve the decryption key for the encrypted document;
       decrypt the encrypted document using the decryption key to generate an unencrypted document without writing a decrypted datastream to user-accessible memory; and
       transmit the unencrypted document to a printer for printing.

2. The system of claim 1 further comprising:
   a serializer configured to update the document usage information if the document is printed.

3. The system of claim 2 wherein the print manager, responsive to receiving a second request for printing, is further configured to:
   determine from the updated document usage information if the second request for printing the encrypted document is authorized;
   if the second request for printing the encrypted document is authorized, then the print manager further configured to:
     decrypt the encrypted document using the decryption key to generate an unencrypted document; and
     transmit the unencrypted document to a printer for printing.

4. The system of claim 2 further comprising:
   a secure datastore configured to store the document usage information;
   wherein the serializer is further configured to store the document usage information on the secure datastore.

5. The system of claim 4 wherein the secure datastore is not accessible to the user.

6. The system of claim 1 wherein the system is implemented in a commercial print shop.

7. A method for printing a document, the method comprising:
   receiving an encrypted document for printing;
   receiving an email authorization message including a decryption key for the encrypted document and document usage information for the encrypted document;
   tagging the email authorization message to prevent a subsequent copy of the authorization message from being processed;
   receiving a first request for printing the encrypted document;
   processing the email to retrieve the document usage information;
   determining from the document usage information if the first request is authorized;
   processing the email to retrieve the decryption key for the encrypted document responsive to the first request being authorized;
   decrypting the encrypted document using the decryption key to generate an unencrypted document without writing a decrypted datastream to user-accessible memory responsive to the first request being authorized; and
   transmitting the unencrypted document to a printer for printing responsive to the first request being authorized.

8. The method of claim 7 further comprising:
   updating the document usage information if the document is printed.

9. The method of claim 8 further comprising:
   receiving a second request for printing the encrypted document;
   determining from the updated documents usage information if the second request for printing the encrypted document is authorized;
   decrypting the encrypted document using the decryption key to generate an unencrypted document responsive to the second request being authorized; and
   transmitting the unencrypted document to a printer for printing responsive to the second request being authorized.

10. The method of claim 8 further comprising:
    storing the document usage information on a secure datastore.

11. The method of claim 10 wherein the secure datastore is not accessible to the user.

12. A method for printing a document the method comprising:
    receiving an encrypted document for printing;

receiving an email authorization message including a decryption key for the encrypted document and document usage information for the encrypted document;

tagging the email authorization message to prevent a subsequent copy of the authorization message from being processed;

receiving a first request for printing a first number of copies of the encrypted document;

processing the email to retrieve the number of copies authorized from the document usage information;

determining if the first request for the first number of copies is authorized based on the document usage information;

processing the email to retrieve the decryption key for the encrypted document responsive to the first request being authorized;

decrypting the encrypted document using the decryption key to generate an unencrypted document without writing a decrypted datastream to user-accessible memory;

transmitting the unencrypted document to a printer for printing the first number of copies;

updating the document usage information responsive to the first number of copies of the document printed; and storing the document usage information on a secure datastore.

13. The method of claim 12 further comprising:

receiving a second request for printing a second number of copies of the encrypted document;

retrieving the document usage information from the secure datastore;

processing the document usage information to retrieve the number of copies authorized;

determining if the second request for the second number of copies is authorized based on the document usage information;

decrypting the encrypted document using the decryption key to generate an unencrypted document responsive to the second request being authorized;

transmitting the unencrypted document to a printer for printing the second number of copies;

updating the document usage information responsive to the second number of copies of the document printed; and storing the document usage information on a secure datastore.

14. The method of claim 12 wherein the secure datastore is not accessible to the user.

\* \* \* \* \*

UNITED STATES PATENT AND TRADEMARK OFFICE
CERTIFICATE OF CORRECTION

PATENT NO. : 7,624,284 B2
APPLICATION NO. : 10/430619
DATED : November 24, 2009
INVENTOR(S) : Lahey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Twenty-sixth Day of October, 2010

David J. Kappos
*Director of the United States Patent and Trademark Office*